United States Patent [19]

Ketonen

[11] Patent Number: 4,753,338

[45] Date of Patent: Jun. 28, 1988

[54] FEEDER APPARATUS FOR TIMBER HARVESTERS

[76] Inventor: Lauri K. Ketonen, Kauppasaarentie 57F, 64100 Kristiinankaupunkt, Finland

[21] Appl. No.: 822,887

[22] Filed: Jan. 27, 1986

Related U.S. Application Data

[63] Continuation-in-part of PCT FI85/00046 filed May 27, 1985, published as WO85/05589 on Dec. 19, 1985.

[30] Foreign Application Priority Data

May 29, 1984 [FI] Finland .................. 842152

[51] Int. Cl.⁴ ............................. B65G 15/10
[52] U.S. Cl. .................... 198/626; 198/692; 198/699.1; 198/836; 198/837; 144/245 A; 83/435.2
[58] Field of Search ............. 198/620, 622, 626, 688.1, 198/692, 860.1, 699.1, 851, 836, 837, 841, 842; 83/435.2, 422, 447; 144/208 R, 242 D, 245 R, 245 D, 340, 341, 245 A; 414/22, 23, 745

[56] References Cited

U.S. PATENT DOCUMENTS

| | | | |
|---|---|---|---|
| 1,533,353 | 4/1925 | Smith | 198/699.1 |
| 1,580,842 | 4/1926 | Mattison | 83/435.2 X |
| 1,746,697 | 2/1930 | Eaglesfield | 198/851 X |
| 1,842,419 | 1/1932 | Morris | 83/435.2 X |
| 1,878,423 | 9/1932 | Nowlin | 83/435.2 X |
| 2,593,324 | 4/1952 | Mann | 198/851 |
| 3,545,597 | 12/1970 | Resener | 198/851 |
| 4,167,999 | 9/1979 | Haggerty | 198/851 |
| 4,615,343 | 10/1986 | Komossa | 198/851 X |

FOREIGN PATENT DOCUMENTS 0500055 5/1976 U.S.S.R. .................. 83/435.2

Primary Examiner—Robert J. Spar
Assistant Examiner—Lyle K. Kimms
Attorney, Agent, or Firm—Horst M. Kasper

[57] ABSTRACT

The present invention provides a feeder apparatus for timber harvesters, the apparatus being intended to pull the log in for trimming and preferably featuring a three strand roller chain rotating around a turning wheel and a cog wheel with log grabbing members attached to the outer plates of the roller links of the roller chain. It is the intention of the present invention to realize a track-operated feeder apparatus simpler yet sturdier than conventional designs. In a feeder apparatus in accordance with invention, the chain is powered by a cog wheel driving the center strand of roller links, and all strands of roller links are supported essentially for their total grab length by rolling beds supporting the rollers.

20 Claims, 2 Drawing Sheets

FEEDER APPARATUS FOR TIMBER HARVESTERS

CROSS-REFERENCE TO RELATED APPLICATIONS

This application is a continuation-in-part of PCT application filed May 27, 1985 and bearing application Ser. No. PCT/FI85/00046. This claim is made under Section 35 U.S.C. 365(c) and under any other Section of the U.S.C. supporting such claim.

BACKGROUND OF THE INVENTION

1. Field of the Invention

The present invention concerns a feeder apparatus for timber harvesters where the feed-in movement, parallel to the log, is generated with a rotating, preferably three strand roller chain which has log grabbing members such as, for example spikes, attached to the outer plates of the roller links of the outer strands. In the following, the roller chain including its grabbing members is referred to as a track.

2. Brief Description of the Background of the Invention Including Prior Art

In tracks, the loading force between the track and its bed presents a problem. Further, it is difficult to support a track in the area where the driving and turning wheels meet the bed. In this area, the cogs of the driving and turning wheels require some space, meaning that the bed cannot extend seamlessly into the turning and driving wheels. Further, in conventional tracks, the track elements tend to move to an upright position since the distance to the grabbing spike, placed perpendicularly to the direction the track is pulled, on top of the pulling link and the track element, is considerable as compared to the space between the joints of the track element. When the chain is pulled, a moment is created which tends to force the front edge of the track element up and the rear section of the element down. Simultaneously, the loading force to which the track and the bed are subjected becomes localized.

SUMMARY OF THE INVENTION

1. Purposes of the Invention

It is an object of the present invention to provide a light-weight compact feeder apparatus which solves the problem of the loading force between the track and its bed.

It is another object of the present invention to provide a feeder apparatus where the bed of the track can extend seamlessly into the turning and driving wheels.

It is a further object of the present invention to provide a feeder apparatus where the tendency of the track elements to move to an upright position is eliminated.

These and other objects and advantages of the present invention will become evident from the description which follows.

2. Brief Description of the Invention

The present invention provides a feeder apparatus for pulling logs into a timber harvester. The feeder apparatus includes a case with two attached outer side walls supporting a first shaft and a second shaft, a drive means attached to the first shaft, a cog wheel coaxially positioned on the first shaft, a turning wheel positioned on the second shaft and a three strand roller chain. The three strand roller chain has a middle strand of roller links and two outer strands of roller links with outer link plates and rotates around the turning wheel and the cog wheel with the cog wheel driving the center strand of roller links. Log grabbing members are attached to the outer plates of the two outer strands of roller links. A rolling bed is provided for supporting the center strand of roller links, and outer rolling beds are provided for supporting the two outer strands of roller links for essentially their total grab length.

The outer rolling beds can be fitted to support the rollers of the outer strands of roller links in the area of the cog wheel for the total length of the roller chain's turn.

A narrow turning wheel can be disposed overlapping the outer rolling beds on each outer side of the outer rolling beds at the end of the chain's travel opposite to the end where the cog wheel is disposed for supporting the rollers of each of the outer strands of roller links.

The roller links of the roller chain can be assembled such that the pin piercing the front section of each roller link also pierces a rear section of the adjacent roller link.

The turning wheels can run essentially in a cutout section of the outer rolling bed so as to provide a smooth passage for the chain in going from a respective outer rolling bed to a respective turning wheel.

The case can include a hollow center box.

The diameter of the cog wheel preferably is from about 3 to 10 times the diameter of the chain rollers.

A rolling bed can extend on a return side to about the area of a box forming part of the case and on the pulled side to about the level of the second shaft.

The width of a rolling bed preferably is from about 0.5 to 0.9 times the distance between two adjacent rolling beds.

The motor can be directly attached to the first drive shaft.

The width between the two outer plates of the chain preferably is from about 9 to 30 centimeters and where the distance between the first shaft and the second shaft preferably from about two to four times the diameter of the cog wheel.

The width of the chains preferably is from about 0.5 to 0.9 the distance between the axes of two neighboring chain rollers of one strand.

Chains supported by a turning wheel preferably are not engaging a cog wheel disposed at the drive axis and vice versa a chain driven by the cog wheel of the drive shaft is not supported directly by a turning wheel.

The feeder apparatus, inclusive of its track, as provided by the present invention, is especially developed for loading processors and harvesters. The low weight and compactness of the feeder apparatus were arrived at by utilizing the roller links normally found in the roller chains employed in tracks. In the track, the roller links have been positioned in three interlaced strands such that adjacent roller links do not have the same position and there are no side plates between the roller links as is the case in conventional multiple strand roller chains.

Preferably, the track elements constitute the roller links of the roller chain. Thus, the price of the track is economical and, by employing various structural solutions, it is easy to weld grabbing spikes on the roller links.

By placing the roller links of the track such that adjacent roller links do not have the same position, many significant advantages are secured as compared for example to a track made of a conventional track made of a multiple strand roller chain.

First, the number of adjacent strands should ideally be three, and, between the roller links, there are no side plates belonging to the pin links as is the case in multiple strand chains. Thus, the width of the roller of the roller links is increased in relation to the total width of the track; the loading capacity of the track in the lateral direction of the chain is high.

Further, the adjacent roller links reach the driving and turning wheels at different times, they move in relation to one another when on the driving and turning wheels, thereby being cleansed of bark and other dirt.

However, because also in this track the distance, perpendicular to the direction of pull, of the grabbing spike from the pulling joint of the roller link is long in relation to the joint spacing of the roller links, the roller links would here also tend to move to an upright position. However, since the inner links in adjacent rows are not parallel but rather arranged such that the rear joint of the preceding link is parallel with the front joint of the next and adjacent link, the rear section of the preceding link, via the pin connecting the two roller links, pushes the front section of the adjacent roller link down. Thus the tendency to move upright described above is eliminated.

In a three strand track, power transmission proper to the track can only take place by employing a cogged driving wheel positioned on the center strand of roller links. Thus, the driving wheel is light-weight and above all, the rollers in the outer strands of roller links can be utilized to support the track against its rolling bed. This makes it possible to design the rolling bed so as to make the rolling bed surface under the outer strands of roller links constitute an arc. The outer surface of the arc corresponds to the diameter of the driving wheel minus its cogs. Thus, the chain is moved very smoothly by the driving wheel. Also, the length of the bed giving support is great.

The situation with the turning wheel is more difficult because of the tightening of the track that is done here. However, by designing the wheels to be narrower, i.e., only approximately one half of the normal width, and by overlapping the corresponding rolling beds, the supporting surface in the area of the turning wheel is made large also. On the center strand of roller links, the supporting rolling bed can be made to full width as far as the axis of the turning wheel.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention.

DESCRIPTION OF INVENTION AND PREFERRED EMBODIMENT

Figure 1:
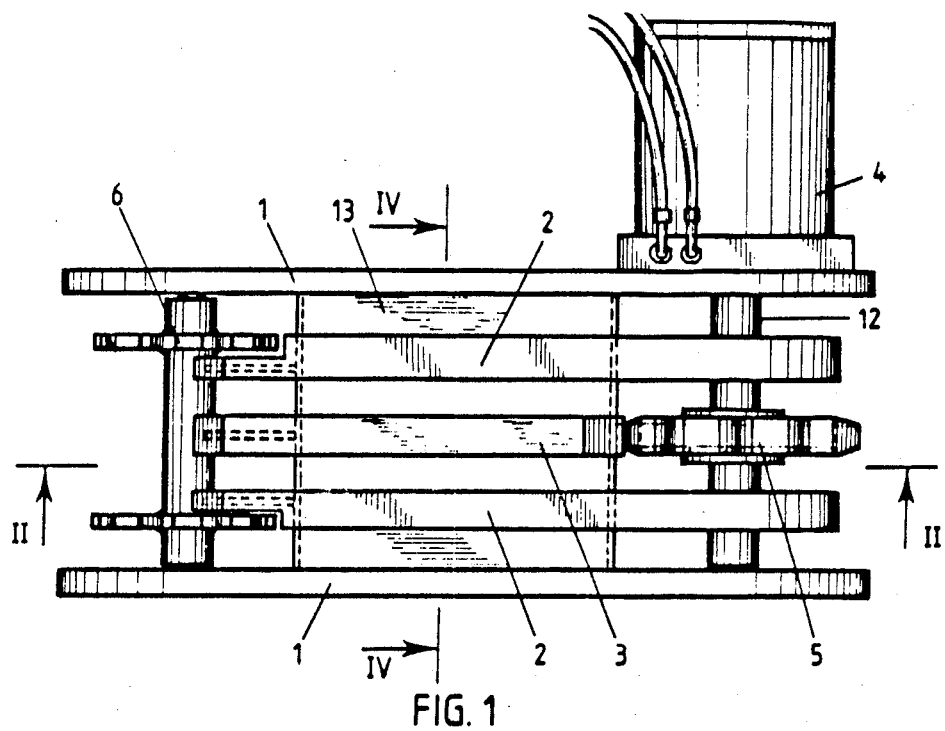
FIG. 1 is a schematic view of the feeder apparatus of the present invention without a track, as seen from the log infeed side.

The present invention provides a feeder apparatus for timber harvester intended to pull the log in for trimming. The feeder apparatus preferably features a three strand roller chain rotating around a turning wheel 6 and a cog wheel 5. Members 10 which have been correspondingly fashioned to grab the log to be infed are attached to the outer plates 15 of the roller links 7 of the roller chain. The chain is powered by the cog wheel 5 driving the center strand 17 of roller links. All strands 17, 18 of roller links are supported for essentially their total grab length by rolling beds 2, 3 supporting the rollers.

The outer rolling beds 2 are fitted to support the rollers 16 of the outer strands 18 of roller links in the area of the driving wheel 5 for the total length of the chain's turn.

The chain rollers 16 of the outer strands 18 of roller links are at the other end of the chain's travel supported by a narrow turning wheel 6 with which the outer rolling beds overlap.

The roller links 7 of the roller chain are assembled such that the pin 8 piercing the front section of each roller link 7 also pierces the rear section of the adjacent roller link 7.

The parts of the feeder apparatus in FIG. 1 are: The side plates 1 of the frame, placed on the outside of the feeder apparatus and joined by box 13. To the top of box 13 are attached the rolling beds 2 and 3. The axis 12 of the driving wheel 5 is supported by bearings mounted at the side plates 1 of a frame. The axis 12 is driven by the hydraulic engine 4. The two strand turning wheel 6 is also mounted with bearings on the side plates 1. However, the turning wheel 6 can be shifted in axial direction and can for instance be fastened with screws for tightening of the track. The turning wheel 6 can also be flush, i.e., cogless. The beds 2 are preferably cutout at their side adjoining the turning wheel such that a smooth transition is provided to the turning wheel. The thickness of the turning wheel can be from about one fifth to one half the width of the bed part and is preferably one third to one quarter of the thickness of the bed part. Preferably the three roller bed sections 2 and 3 have about equal width. The first shaft 12 and the second shaft 26 can have a thickness of from about one to two times the diameter of the rollers of the chain members.

Figure 2:
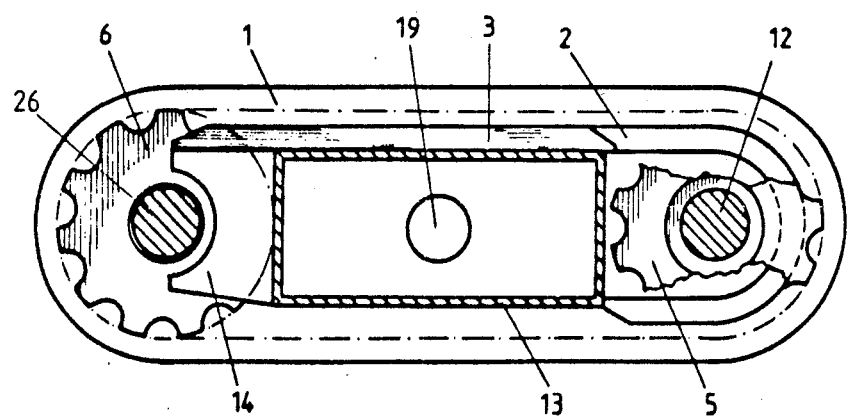
FIG. 2 is a cross section of the section indicated as II—II in FIG. 1.

In FIG. 2, the rolling bed 2 is seen to continue, in the area of the chain's rotating movement around the turning wheel 5, such that the diameter of the surface of the bed 2 is equivalent to that of the driving wheel 5 minus its cogs. The rolling bed 3 extends from the axis of the turning wheel 6 as far as the driving wheel 5, the surfaces of the bed having slanted ends. It can also be seen that the ends of beds 2 are slanted and made narrower near the turning wheel 6. Beds 2 and 3 are supported via the plate 14 against the box 13. Via the side plates 1 and the different holes 79 in its body, the feeder apparatus can be conveniently attached to a timber harvester. The travel path of the track's pulling joints is shown as a dashed line in FIG. 2.

Figure 3:
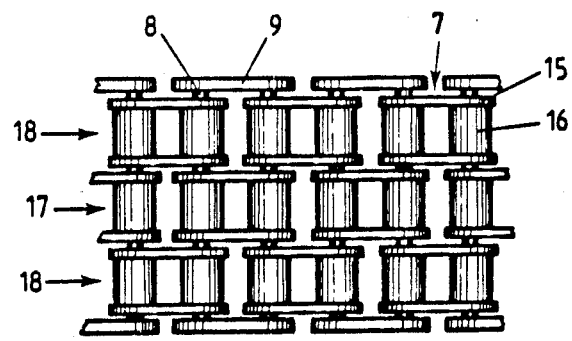
FIG. 3 is a schematic view of the roller chain, or track used in the feeding apparatus of the present invention, minus the grabbing members.

A section of the track without the grabbing spikes is shown in FIG. 3. The track substantially comprises the roller links 7 of the roller chain. The roller links 7 are placed in three alternately aligned strands, i.e., the pins 8 piercing the front section of a roller link of roller chain strand 18 also pierces the rear section of the adjacent roller link 7 of roller chain strand 17. The pins 8 are attached in pairs to the chain side plates 9.

Figure 4:
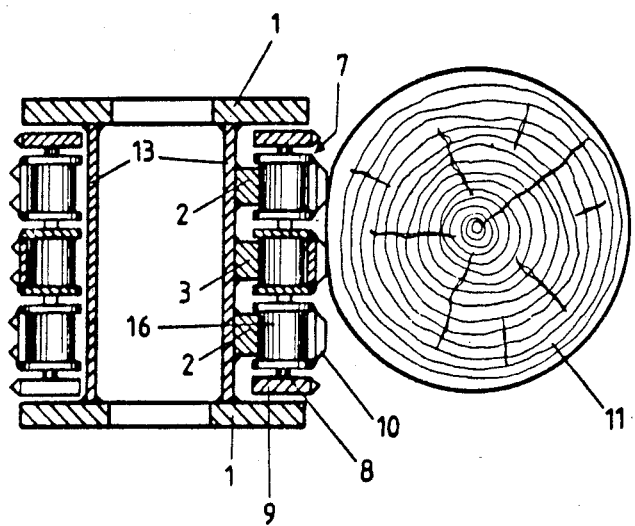
FIG. 4 is a cross-section of the section indicated as IV—IV in FIG. 1, including the track and illustrating varying shapes of spikes of a chain.

Shown in FIG. 4 is a cross-section of the section IV—IV indicated in FIG. 1. Shown in FIG. 4 is also the track, its grabbing spikes 10 and the log 11 to be fed in. At the other side of the log there is another feeder apparatus (not shown). The two feeder apparatuses together form a jaw, by which a log is grabbed. It can be seen that the rolling beds 2 and 3 are conveniently flat in the area of the box 13; there are no beds on the return side of the chain's movement within the area of the box. The side plates 1 of the frame guide the track laterally via the side plates 9 of the outer links. The spikes of the chain can have varying shape as shown in FIG. 4.

It will be understood that each of the elements described above, or two or more together, may also find a useful application in other types of feeder apparatus differing from the types described above.

While the invention has been illustrated and described as embodied in the context of a feeder apparatus for timber harvesters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A feeder apparatus for timber harvesters for pulling logs into the timber harvester comprising
   a frame;
   two outer side walls attached to the frame;
   a first shaft supported by the side walls;
   a second shaft supported by the side walls;
   a drive means attached to the first shaft;
   a cog wheel coaxially positioned on the first shaft;
   a turning wheel positioned on the second shaft;
   a three strand roller chain having middle strand of roller links and two outer strands of roller links with outer plates, wherein the roller chain rotates around the turning wheel and the cog wheel and wherein the cog wheel drives the center strand of roller links and wherein the turning wheel engages the outer strands;
   log grabbing members attached to the outer plates of the two outer strands of roller links;
   an inner rolling bed for supporting the middle strand of roller links;
   outer rolling beds for supporting the two outer strands of roller links for essentially their total grab length, wherein the outer rolling beds are fitted to support the rollers of the outer strands of roller links in the area of the cog wheel for the total length of the roller chain's turn.

2. The feeder apparatus for timber harvesters according to claim 1 wherein the turning wheel is disposed overlapping the outer rolling beds on each outer side of the outer rolling beds at the end of the chain's travel opposite to the end where the cog wheel is disposed for supporting the rollers of each of the outer strands of roller links.

3. The feeder apparatus for timber harvesters according to claim 1 further comprising pins piercing the rollers of the three strand roller chain.

4. The feeder apparatus for timber harvesters according to claim 1 wherein the turning wheel runs essentially in a cutout section of the outer rolling beds such as to provide a smooth passage for the chain in going from the outer rolling beds to said turning wheel.

5. The feeder apparatus for timber harvesters according to claim 1 wherein the frame includes a hollow center box.

6. The feeder apparatus for timber harvesters according to claim 1 wherein the diameter of the cog wheel is from about 3 to 10 times the diameter of each of the chain rollers.

7. The feeder apparatus for timber harvesters according to claim 1 wherein the frame further comprises a box shaped member and wherein the outer rolling beds extend on a return side to about the area of the box shaped member.

8. The feeder apparatus for timber harvesters according to claim 1 wherein the width of a rolling bed is from about 0.5 to 0.9 times the distance between two adjacent rolling beds.

9. The feeder apparatus for timber harvesters according to claim 1 wherein the drive means comprises a motor directly attached to the first drive shaft.

10. The feeder apparatus for timber harvesters according to claim 1 wherein the width between the two outer plates of the chain is from about 9 to 30 centimeters and wherein the distance between the first shaft and the second shaft is from about two to four times the diameter of the cog wheel.

11. The feeder apparatus for timber harvesters according to claim 1 wherein the width of the chains is from about 0.5 to 0.9 the distance between the axes of two neighboring chain rollers of one strand.

12. The feeder apparatus for timber harvesters according to claim 1 wherein chains supported by the turning wheel are not engaging said cog wheel disposed at the first shaft and wherein the chain driven by the cog wheel of the first shaft is not supported by the turning wheel.

13. The feeder apparatus for timber harvesters according to claim 1 wherein the turning wheel comprises two spaced apart sprockets mounted on the second shaft associated with the outer strands.

14. A feeder apparatus for timber harvesters for pulling logs into the timber harvester comprising
   a frame;
   two outer side walls attached to the frame;
   a first shaft supported by the side walls;
   a second shaft supported by the side walls;
   a drive means attached to the first shaft;
   a cog wheel coaxially positioned on the first shaft;
   two turning wheels positioned on the second shaft;
   a three strand roller chain having a middle strand of inner roller links and two outer strands of inner roller links with outer plates, and a strand of outer links, which hold all three neighboring inner links together, wherein the roller chain rotates around the turning wheels and the cog wheel and wherein the cog wheel drives the center strand of roller links;

log grabbing members attached to the outer plates of the two outer and middle strands of inner roller links; an inner rolling bed for supporting the middle strand of roller links; and outer rolling beds for supporting the two outer strands of roller links for essentially their total grab length and for supporting the rollers of the outer strands of roller links in the area of the cog wheel for substantially the total length of the roller chain's turn.

15. The feeder apparatus for timber harvesters according to claim 14 wherein the turning wheels are disposed overlapping the outer rolling beds on each outer side of the outer rolling beds at the end of the chain's travel opposite to the end where the cog wheel is disposed for supporting the rollers of each of the outer strands of roller links; and wherein the turning wheels run essentially in a cutout section of the outer rolling bed such as to provide a smooth passage for the chain in going from a respective outer rolling bed to a respective turning wheel.

16. The feeder apparatus for timber harvesters according to claim 14 further comprising pins piercing the rollers of the three strand roller chain and wherein the frame includes a hollow center box.

17. The feeder apparatus for timber harvesters according to claim 14
wherein the diameter of the cog wheel is from about 3 to 10 times the diameter of each of the chain rollers;
wherein the width of a rolling bed is from about 0.5 to 0.9 times the distance between two adjacent rolling beds;
wherein the width between the two outer strands of the chain is from about 9 to 30 centimeters and where the distance between the first shaft and the second shaft is from about two to four times the diameter of the cog wheel; and
wherein the width of the chains is from about 0.5 to 0.9 the distance between the axes of two neighboring chain rollers of one strand.

18. The feeder apparatus for timber harvesters according to claim 14 wherein the frame further comprises a box shaped member and wherein the outer rolling beds extend on a return side to about the area of the box shaped member.

19. The feeder apparatus for timber harvesters according to claim 14 wherein the drive means comprises a motor directly attached to the first drive shaft.

20. The feeder apparatus for timber harvesters according to claim 14 wherein chains supported by the turning wheels are not engaging said cog wheel disposed at the first shaft and where the chain driven by the cog wheel of the first shaft is not supported by the turning wheels.

* * * * *